US008971707B2

(12) United States Patent
Colaianna et al.

(10) Patent No.: US 8,971,707 B2
(45) Date of Patent: Mar. 3, 2015

(54) LAN CABLES

(75) Inventors: Pasqua Colaianna, Milan (IT); Giulio Brinati, Milan (IT); Aldo Sanguineti, Milan (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

(21) Appl. No.: 12/280,316

(22) PCT Filed: Feb. 20, 2007

(86) PCT No.: PCT/EP2007/051591
§ 371 (c)(1),
(2), (4) Date: Aug. 21, 2008

(87) PCT Pub. No.: WO2007/096347
PCT Pub. Date: Aug. 30, 2007

(65) Prior Publication Data
US 2009/0192259 A1 Jul. 30, 2009

(30) Foreign Application Priority Data

Feb. 23, 2006 (IT) .............................. MI2006A0327
Feb. 23, 2006 (IT) .............................. MI2006A0329

(51) Int. Cl.
*H01B 3/44* (2006.01)
*C08F 214/18* (2006.01)
*C08F 214/26* (2006.01)
*C09D 127/18* (2006.01)

(52) U.S. Cl.
CPC ......... *C08F 214/184* (2013.01); *C08F 214/262* (2013.01); *C09D 127/18* (2013.01); *H01B 3/445* (2013.01)

USPC ............ 398/58; 526/247; 526/254; 526/255; 427/117; 427/120; 524/544; 524/545; 524/546

(58) Field of Classification Search
USPC ........................... 526/247, 250, 254; 427/117
See application file for complete search history.

(56) References Cited

U.S. PATENT DOCUMENTS

| 4,029,868 A | 6/1977 | Carlson |
| 4,262,101 A | 4/1981 | Hartwimmer et al. |
| 4,743,658 A * | 5/1988 | Imbalzano et al. ........ 525/326.4 |
| 4,764,538 A | 8/1988 | Buckmaster et al. |
| 4,963,609 A | 10/1990 | Anderson et al. |
| 5,463,006 A * | 10/1995 | Abusleme et al. ............ 526/247 |
| 6,696,526 B1 | 2/2004 | Kaulbach et al. |
| 2002/0111433 A1 | 8/2002 | Lee et al. |

FOREIGN PATENT DOCUMENTS

| EP | 0 633 274 B1 | 1/1997 |
| EP | 0 423 995 B1 | 3/1998 |
| WO | WO 98/10012 A1 | 3/1998 |
| WO | WO 01/80253 A1 | 10/2001 |

* cited by examiner

*Primary Examiner* — Nicole M Buie-Hatcher
(74) *Attorney, Agent, or Firm* — Arent Fox LLP

(57) ABSTRACT

Use in LAN cable applications, as materials for the coating of the primary cable and for the external jacket, of TFE thermo-processable perfluoropolymers comprising perfluoroalkylvinylethers in the following amounts, expressed as percent by weight on the total of the monomers: a) 0-5.5% of perfluoromethylvinylether (PMVE); b) 0.4-4.5% of perfluoroethylvinylether (PEVE) and/or perfluoropropylvinylether (PPVE); when a) is present, then a)+b) ranges from 1.5% to 5.5% by weight on the total of the monomers; optionally c) 0-6% of hexafluoropropene (HFP); the TFE amount being the complement to 100% by weight.

13 Claims, No Drawings

LAN CABLES

The present invention relates to the use of TFE thermoprocessable perfluoropolymers usable in cable applications both for the primary cable coating and as external jacket.

The cables, used to transmit data, vocal signals, etc. are also called plenum cables. They generally comprise an external jacket formed of a polymeric material and a core formed of primary cables constituted by metal conducting wire pairs, for example copper, coated by a perfluoropolymer. Examples of cables used as plenum cables comprise a series of coaxial insulated primary cables or a series of twisted pairs primary cables.

The materials forming, respectively, the primary cable coating and the external jacket must have good mechanical properties, good electrical insulating properties, good extrusion or processing rate. Furthermore said materials must meet the very strict anti-fire rules which regulate both the smoke emission and the flame spread. On the basis of the NFPA 255 rule the smoke emission, expressed as smoke developed index, must be lower than or equal to 50 and the flame spreading expressed as flame spread index, must be lower than or equal to 25. The cables constituted by polymeric materials passing this rule are identified with the CMP-50 initials.

Various kinds of thermoprocessable polymers are known in the prior art. These polymers can be grouped according to the following classes:
- tetrafluoroethylene (TFE) with hexafluoropropene (HFP) (FEP polymers) which optionally contain other monomers, for example perfluoroalkylvinylethers (PAVE);
- TFE and PAVE.

The polymers of the first class are for example described in the following prior art.

U.S. Pat. No. 4,029,868 (Carlson) describes TFE/HFP/PPVE terpolymers and TFE/HFP/perfluoroethylvinylether (PEVE) wherein HFPI ranges from 0.9 to 2.7 (corresponding to an HFP amount comprised between 2.9 and 8.6% by weight, obtained by multiplying HFPI (HFP Index) by the conversion factor (fc) 3.2 reported in USSIR H130); PPVE or PEVE range from 0.5 to 3% by weight. These terpolymers have, compared with the TFE/HFP copolymers, low melt viscosity, higher stress at break at high temperature, lower tendency to snap back. The flex life is comparable with or better than that of the TFE/HFP copolymers. This patent does not mention the amount of smokes that these polymers release when subjected to a heat source.

USSIR H130 (McDermott) describes TFE/HFP/perfluoropropylvinylether (PPVE) copolymers wherein HFP ranges from 9 to 17% by weight (corresponding to a HFPI value from 2.8 to 5.3) and PPVE ranges from 0.2 to 2% by weight. The polymers described in this publication have an improved stress crack resistance (SCR) compared with TFE/HFP copolymers having the same melt viscosity (MV) or, alternatively, show MV values lower than those of the TFE/HFP copolymers, allowing higher extrusion rates even maintaining high SCR values. These polymers are used to coat cables. The amount of smokes which these polymers develop when subjected to a heat source is not mentioned.

U.S. Pat. No. 4,262,101 relates to a process to copolymerize TFE with perfluoro(alkyl vinyl)ethers of formula:

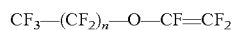

wherein n is an integer from 1 to 3,
in the presence of HFP in amounts from 25 to 5% by moles calculated on the total amount of added comonomers. Claim 1 of the patent relates to terpolymers containing from 0.3% to 2.1% by moles (0.45-3.15% by weight) of HFP and from 0.3 to 2.4% by moles (0.8-6.4% by weight) of PPVE. The polymers according to this patent have properties similar to those of PTFE, but they have good processing properties and good properties of the final manufactured article. In the patent it is mentioned that these terpolymers can be used to coat electric wires. Also in this case the amount of smokes developed by these polymers when subjected to a heat source is not mentioned.

U.S. Pat. No. 5,677,404 (Blair 1) describes partially crystalline polymers comprising: HFPI 2.8-5.3 (corresponding to HFP 9-17% by weight, by using a conversion factor fc=3.2), PEVE 0.2-3% by weight. These polymers can be extruded at a higher rate that that of the corresponding TFE/HFP/PPVE polymers, even maintaining a high SCR value. The examples show that the polymers can be extruded on AWG24 copper conducting wires. In this patent no mention is made to the NFPA 255 rule, therefore the smoke problem has not been considered.

U.S. Pat. No. 5,703,185 (Blair 2) describes TFE/HFP/perfluoroethylvinylether copolymers wherein HFPI ranges from 2.2 to 5.3 (corresponding to a HFP content as percent by weight from 7 to 17%). The PEVE content ranges from 0.2 to 3% by weight. With respect to the TFE/HFP/PPVE terpolymers, the terpolymers according to this patent show the same advantages indicated in U.S. Pat. No. 5,677,404. The same comments made for the latter patent can be repeated.

U.S. Pat. No. 5,688,885 (Blair 3) describes TFE/HFP/perfluoromethylvinylether (PMVE) polymers having a high flex life, wherein HFPI ranges from 1.9 to 5.3 (corresponding to a HFP content as percent by weight from 6.08 to 17%). The PMVE content ranges from 0.5% to 5% by weight. These polymers are used for the cable insulation. The amount of smokes developed by these polymers when subjected to a heat source is not mentioned.

U.S. Pat. No. 4,587,316 describes TFE terpolymers with HFP and fluoroalkylvinylethers having formula:

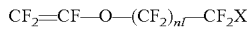

wherein nl is an integer from 3 to 9 and X is hydrogen or fluorine, the HFP content ranges from 8 to 15% by weight, that of fluoroalkylvinylether from 0.2 to 2% by weight. The polymers have a good melt processability and the articles obtained therefrom show a good SCR and flex resistance. The smoke amount developed by these polymers when subjected to a heat source is not mentioned.

The polymers of the second class TFE/PAVE are for example described in the following prior art.

WO 2005/073,984 describes perfluoropolymer compositions containing from about 10 to about 60% by weight of an inorganic char-forming agent and from about 0.1 to about 5% by weight of an hydrocarbon polymer which is thermally stable at the melting temperature of said perfluoropolymers. In the patent application it is mentioned that this composition as melt blend, for example as an article obtained by extrusion, passes the NFPA-255 rule. The perfluoropolymers without the addition of the above mentioned additives do not pass the NFPA-255 rule. The usable perfluoropolymers are for example the TFE/HFP copolymers, wherein HFP ranges from about 9 to about 17% by weight; TFE/HFP/perfluoroalkylvinylether (PAVE) copolymers, wherein HFP ranges from about 9 to about 17% by weight and the perfluoroalkylvinylether is in an amount from about 0.2 to about 3% by weight and preferably is perfluoroethylvinylether; TFE/PAVE copolymers, wherein the perfluoroalkylvinylethers range from about 1 to about 15% by weight. Furthermore in the background of this patent application it is stated that cable jackets with TFE/HFP (FEP) copolymers, which pass the NFPA-255 rule, are known. These FEPs have a melt flow rate (MFR) of 2-7 g/10 min (5 Kg load, ASTM D1238) and therefore a high melt viscosity. The drawback of these FEPs is the high production costs since said polymers can be extruded only up to rates of 120 ft/min, that is about 40 m/min, since, as said, the melt viscosity of these FEPs is very high. These low extrusion rate values mean a poor processability. In this patent application it is stated that, when the MFR value of the perfluoropolymers exceeds 7 g/10 min, the NFPA rule is not passed.

The need was felt to have available perfluorinated thermoprocessable copolymers usable as primary and jacket cables, having the following combination of properties:
  good electrical insulation properties, i.e. dielectric constant values lower than 2.5;
  good mechanical properties;
  high processing properties:
    the primary cable extrudable for example on a copper conductor wire classified as AWG20-22-24;
    the jacket extrudable for example on a series of primary cables;
  value of the smoke amount, measured according to the below described method, not higher than 150 units.

The Applicant has found that it is possible to correlate the smoke amount value according to the method described herein below with the NFPA 255 rule.

The Applicant has surprisingly and unexpectedly found a class of thermoprocessable perfluoropolymers solving the above mentioned technical problem.

It is an object of the present invention the use in cable applications, as materials for the primary cable coating and for the external jacket, of TFE thermoprocessable perfluoropolymers comprising perfluoroalkylvinylethers in the following amounts, expressed as percent by weight on the total of the monomers:
a) 0-5.5% of perfluoromethylvinylether (PMVE);
b) 0.4-4.5% of perfluoroethylvinylether (PEVE) and/or perfluoropropylvinylether (PPVE);
when a) is present, the total amount of perfluoroalkylvinylethers (PAVE) a)+b) ranges from 1.5% to 5.5% by weight, preferably from 2.5% to 5.5% by weight on the total of the monomers; optionally
c) 0-6% of hexafluoropropene (HFP);
the TFE amount being the complement to 100% by weight.

Therefore the TFE thermoprocessable perfluoropolymers of the invention contain (% by weight):
a) 0-5.5% of perfluoromethylvinylether (PMVE);
b) 0.4-4.5% of perfluoroethylvinylether (PEVE) and/or perfluoropropylvinylether (PPVE);
when a) is present, the total amount of perfluoroalkylvinylethers (PAVE) a)+b) ranges from 1.5% to 5.5% by weight, preferably from 2.5% to 5.5% on the total of the monomers; optionally
c) 0-6% of hexafluoropropene (HFP);
the TFE amount being the complement to 100% by weight.

Preferably the TFE thermoprocessable perfluoropolymers contain:
a) 0.6-5.0%, preferably 2.0-4.5%, of perfluoromethylvinylether (PMVE);
b) 1.0-4.0% of perfluoroethylvinylether (PEVE) and/or perfluoropropylvinylether (PPVE);
the TFE amount being the complement to 100% by weight.
Preferably b) is PEVE.

Preferably in the TFE thermoprocessable perfluoropolymers, when a) is present, the total amount of the perfluoroalkylvinylethers a)+b) expressed as percent by weight on the total monomers ranges from 3.0 to 5.0%. Still more preferably it ranges from 4.0 to 5.0%.

Instead of 3%, the lower limit of the preferred range of a)+b) can be also as low as 2.5%.

The perfluoropolymers have Melt Flow Index (MFI) (ASTM D-1238) comprised between 1 to 60 g/10 min.

The perfluoropolymer used to coat the primary cable preferably has a MFI comprised between 20 and 40 g/10 min.

The invention perfluoropolymers can be used to coat both the primary cable and to form the external jacket. For the jacket, perfluoropolymers having MFI lower than that of the perfluoropolymer used for the primary cable, can be used according to the present invention. Generally the MFI value of the perfluoropolymer used for the jacket ranges from 2 to 10 g/10 min, preferably from 4 to 8 g/10 min. The Applicant has found that by using the invention perfluoropolymers to coat cables, the extrusion rates are high. For example for the primary cable it is higher than 305 m/min. For the jacket, even at low MFI values, for example between 4 and 8 g/10 min, the extrusion rate is higher than 100 m/min. Said high extrusion rate values are combined with low smoke values which meet the method described hereinafter.

An equipment comprising an oven (V.CG. Ventura mod. FE1N), having in the centre a cylindrical hollow of about 4 cm of diameter, height of about 18 cm, open on the upper side (or upper surface) is used. From this side a circular section quartz sampleholder is introduced, having 16 cm height and internal diameter 3.5 cm, the external one calibrated so that the external sampleholder surfaces are in contact with the surfaces of the oven cylindrical hollow. The oven is positioned in a test chamber completely darkened so as to have a stable and constant signal in the absence of smoke (darkening signal). A Laser source (red light) is positioned so that the beam emitted passes close to the oven open upper surface. A telecamera is placed in a position opposite to the laser source, at a 30° angle with respect to the laser beam. The oven internal temperature is brought to 550° C. About 6 g of sample (perfluoropolymer) in the form of two small molded plates having each the following sizes: height 3 mm and diameter 10 mm, are introduced in the sampleholder. The telecamera takes the light scattered from the smoke produced by the sample for the whole experiment duration, i.e. until smoke does not develop any longer. Generally a 30 minute time is sufficient to carry out the test. The image coming from the telecamera is digitized by an acquiring program using the Lab View® software by National Instruments®. 20 images/second are recorded. The program calculates on each image the average intensity, defined as average of the single pixel grey values. From the so calculated intensity value the dark signal is subtracted and finally an average on each second (20 images) is carried out. The average signal intensities and the corresponding times, expressed in seconds, are saved in a file, at which said average intensities have been calculated. The times are calculated starting from the beginning of the test, i.e. from the introduction of the samples in the oven.

The so obtained data are then integrated by using an Excel® file, obtaining a measurement of the total smoke amount emitted by the sample. The invention thermoprocessable perfluoropolymers give a value of the smoke amount emitted not higher than 150 units. According to the present invention values equal or lower than 150 are low smoke values. As internal standard, in this determination a commercial sample Hyflon® MFA 640 can be used. The smoke amount value of this polymer, measured by the present method, is about 500±100. Smoke values lower than 150 allow to pass the NFPA 255 rule. As a matter of fact polymers having smoke amount values of about 120, used as primary and jacket in the construction called 4 UTP, give values of about 43 of Smoke developed index according to the above mentioned rule. See the Examples. The Applicant has found very advantageous to use the above described test to determine smoke index values, since with this method very low polymer amounts are sufficient.

As said, the perfluoropolymers used for cable applications according to the present invention have good electric insulation and processing properties (high extrusion rates).

The use in the cable preparation of the perfluoropolymers according to the present invention results advantageous from an industrial point of view, since the use of additives, as inorganic mineral fillers, for example oxides can be avoided, which according to the prior art are instead used admixed with (per)fluoropolymers to allow the cables to also pass the NFPA 255 rule, i.e. showing both low smoke developed index and flame spread index values maintaining at the same time good extrusion rates.

The Applicant has found that, when in the preparation of cable construction called 4 UTP, TFE-based perfluoropolymers are used for the primary cable and for the jacket and the total amount of perfluoroalkylvinylether monomers a)+b) is higher than 5.5% by weight, for example 7.0%, by weight, the obtained cable does not pass the above mentioned smoke test and the NFPA 255 rule.

The same occurs, when in the cable preparation TFE-based perfluoropolymers having as perfluoroalkylvinylethers only b) are used in a total amount higher than 4.5% by weight. See the comparative Examples.

The Applicant has found that in cables the NFPA-255 rule is not passed for cables wherein the jacket MFI values are lower than 7, which according to the prior art is the limit over which the smoke emission should not comply with the standard any longer. The Applicant has indeed found that the cable composition (primary+jacket) results critical to pass this rule. This was not predictable on the basis of the prior art teachings.

A further and second embodiment of the present invention is the use of comonomer c) hexafluoropropene (HFP) in the polymeric composition of the first embodiment. This second embodiment relates to the use in cable applications, as materials for the primary cable coating and for the external jacket, of TFE thermoprocessable perfluoropolymers having the following compositions (percent by weight):
a) 0-5.5% of perfluoromethylvinylether (PMVE);
b) 0.4-4.5% of perfluoroethylvinylether (PEVE) and/or perfluoropropylvinylether (PPVE);
c) from 0.5 to 6% of hexafluoropropene (HFP);
when a) is present, the total amount of perfluoroalkylvinylethers (PAVE) a)+b) ranges from 1.5% to 5.5% by weight on the total of the monomers;
the TFE amount being the complement to 100% by weight.

Preferably the TFE thermoprocessable perfluoropolymers contain:
a) 0.7-4.5% of perfluoromethylvinylether (PMVE);
b) 1.0-4.0% of perfluoroethylvinylether (PEVE) and/or perfluoropropylvinylether (PPVE);
c) 0.7-4% of HFP;
the TFE amount being the complement to 100% by weight.

Preferably b) is PEVE.

Preferably in the TFE thermoprocessable perfluoropolymers according to the second embodiment, when a) is present, the amount of the perfluoroalkylvinylethers a)+b) expressed as percent by weight on the total monomers ranges from 3.0 to 5.0%, preferably from 4.0 to 5.0%.

Instead of 3%, the lower limit of the preferred range of a)+b) can be also as low as 2.5%.

Also in this embodiment the perfluoropolymers have Melt Flow Index (MFI) (ASTM D-1238) comprised between 1 to 60 g/10 min. The perfluoropolymer used to coat the primary cable preferably has a MFI comprised between 20 and 40 g/10 min.

A further object of the present invention relates to cables obtainable with the perfluoropolymer compositions of the second embodiment, wherein the coating of the primary cable and/or jacket is formed of perfluoropolymers according to the polymeric composition of the second embodiment.

Also the perfluoropolymers of the second embodiment can be used to coat both the primary cable and to form the external jacket. For the jacket, the invention perfluoropolymers having MFI lower than that of the perfluoropolymer used for the primary cable, can be used. Generally the MFI value of the perfluoropolymer used as jacket ranges from 2 to 10 g/10 min, preferably from 4 to 8 g/10 min. The Applicant has found that by using the perfluoropolymers of the second embodiment to coat cables, the extrusion rate keeps on high values. For example for the primary it is higher than 305 m/min. For the jacket, even at low MFI values, for example between 4 and 8 g/10 min, the extrusion rate is higher than 100 m/min. Said high extrusion rate values are combined with low smoke values which meet the test herein above described in the first embodiment.

As said, the perfluoropolymers used for cable applications of the second embodiment of the present invention have good electric insulation and processing properties. Their use in the cable preparation is advantageous from an industrial point of view, since the use of additives, as mineral or inorganic fillers, for example oxides can be avoided. The inorganic fillers according to the prior art are mixed with (per)fluoropolymers to obtain cables that pass the NFPA 255 rule, i.e. said cables show low smoke developed index and flame spread index values while maintaining at the same time good extrusion rates.

The Applicant has found that, when in the preparation of cable construction called 4 UTP, TFE-based perfluoropolymers are used for the primary cable and for the jacket, and the total amount of perfluoroalkylvinylether monomers a)+b) is higher than 5.5% by weight, for example 7.0% by weight, the obtained cable does not pass the above mentioned smoke test and the NFPA 255 rule.

The same occurs when in the cable preparation TFE-based perfluoropolymers are used which contain as perfluoroalkylvinylethers only b) in a total amount higher than 4.5% by weight. See the comparative examples.

The Applicant has found that the NFPA-255 rule is not passed for cables wherein the jacket MFI values are lower than 7, which according to the prior art is the limit over which the smoke emission should not comply with the standard any longer. The Applicant has indeed found that the cable composition (primary+jacket) of the second embodiment of the present invention results critical to pass this rule. This was not predictable on the basis of the prior art teachings.

A further object of the present invention refers to TFE thermoprocessable perfluoropolymers of the second embodiment comprising (percent by w.):
a) 0.2-5.5% of perfluoromethylvinylether (PMVE);
b) 0.4-4.5% of perfluoroethylvinylether (PEVE) and/or perfluoropropylvinylether (PPVE);
c) from 0.5 to 6% of hexafluoropropene (HFP);
the amount of perfluoroalkylvinylethers a)+b) (PAVE) ranges from 1.5% to 5.5% by weight on the total of the monomers;
the TFE amount being the complement to 100% by weight.

Preferably said TFE thermoprocessable perfluoropolymers contain:

a) 0.7-4.5% of perfluoromethylvinylether (PMVE);
b) 1.0-4.0% of perfluoroethylvinylether (PEVE) and/or perfluoropropylvinylether (PPVE);
c) 0.7-4.0% of HFP;
the TFE amount being the complement to 100% by weight.

Preferably b) is PEVE.

Preferably in the TFE thermoprocessable perfluoropolymers according to the further object of the present invention the amount of perfluoroalkylvinylethers a)+b) expressed as percent by weight on the total monomers ranges from 3.0 to 5.0%, still more preferably from 4.0 to 5.0%.

Instead of 3%, the lower limit of the preferred range of a)+b) can be also as low as 2.5%.

The copolymers of the second embodiment of the present invention have dielectric constant lower than 2.5.

The fluoropolymers of the first and second embodiment of the present invention can be prepared by radical polymerization in water or organic solvent. The emulsion polymerization in aqueous medium is carried out in the presence of an inorganic water-soluble radical initiator, such as for example peroxide, percarbonate, persulphate or azo compounds. Generally these radicals have sufficiently long shelf-life times, such that these compounds are present during the whole polymerization time. In some cases a reducing agent can be added so as to make easier the initiator decomposition. Said compounds can be for example iron salts. The initiator amount used depends on the reaction temperature and on the reaction conditions. In particular these polymers are synthesized at a temperature comprised between 55° C. and 90° C., preferably from 70° C. to 80° C. Furthermore for the synthesis of these polymers in particular a chain transfer agent is introduced so as to regulate the polymer molecular weight, giving rise to narrow molecular weight distributions. The used transfer agents can be ethane, methane, propane, chloroform, etc. The polymerization in aqueous phase takes place in the presence of fluorinated surfactants such as for example perfluoroalkylcarboxylic acid salts (for example ammonium perfluorocaprylate, ammonium perfluorooctanoate), or other compounds such as for example perfluoroalkoxybenzensulphonic acid salts, as described for example in EP 184,459. For the synthesis of the invention polymers it is particularly advantageous to carry out the polymerization in aqueous phase in the presence of perfluoropolyethers, which can be added in the reaction medium under the form of aqueous emulsion in the presence of a suitable dispersing agent, as described in EP 247,379 or, preferably, in the form of aqueous microemulsion as described in U.S. Pat. No. 4,864,006.

Alternatively the polymerization can be carried out in an organic solvent as described for example in U.S. Pat. No. 3,642,742. The polymerization initiator must be soluble in the reaction solvent. These initiators can be alkylpercarbonates or perfluoroacylperoxides. The comonomers are generally introduced in the reactor under the form of gaseous mixtures. The polymerization pressure is maintained constant by feeding the gaseous mixture TFE/perfluoroalkylvinylether. The reaction pressures are comprised between 15 Atm (1.5 MPa) and 40 Atm (4 MPa), preferably between 20 Atm (2 MPa) and 30 Atm (3 MPa).

The latex is coagulated and the solid recovered is dried and granulated. The granules are extruded in cable line to coat a metal conductor, for example copper. The extrusion temperature is generally of at least 50° C. higher than the polymer second melting temperature.

The primary cable made with the perfluoropolymers of the present invention are extrudable also on a copper conductor wire classified as AWG26-28-30.

The following Examples illustrate the invention without limiting the scope thereof.

EXAMPLES

The physical and mechanical properties of the copolymers illustrated in the Examples have been determined with the following methods.

Measurement of the Smoke Emission and Flame Spreading in the Cable 4 UTP (Primary Cable+Jacket)

The measurement of the smoke emission and of the flame spreading, measured on a cable called 4 UTP, is carried out according to the NFPA 255 standard.

Determination of the Smoke Amount Released by a Perfluoropolymer

An equipment comprising an oven (V.CG. Ventura mod. FE1N), having in the centre a cylindrical hollow of about 4 cm of diameter, height of about 18 cm, open on the upper side (or upper surface) is used. From this side a circular section quartz sampleholder is introduced, having 16 cm height and internal diameter 3.5 cm, the external one calibrated so that the external sampleholder surfaces are in contact with the surfaces of the cylindrical oven hollow. The oven is positioned in a test chamber completely darkened so as to have a stable and constant signal in the absence of smoke (dark signal). A Laser source (red light) is positioned so that the beam emitted passes close to the oven open upper surface. A telecamera is placed in a position opposite to the laser source, at a 30° angle with respect to the laser beam. The oven internal temperature is brought to 550° C. About 6 g of sample (perfluoropolymer) in the form of two small molded plates having each the following sizes: height 3 mm and diameter 10 mm, are introduced in the sampleholder. The telecamera takes the light scattered from the smoke produced by the sample for the whole experiment duration, i.e. until smoke does not develop any longer. Generally a 30 minute time is sufficient to carry out the test. The image coming from the telecamera is digitized by an acquiring program using the Lab View® software by National Instruments®. 20 images/second are recorded. The program calculates on each image the average intensity, defined as average of the single pixel grey values. From the so calculated intensity value the dark signal is subtracted and finally an average on each second (20 images) is carried out. The average signal intensities and the corresponding times, expressed in seconds, are saved in a file, at which said average intensities have been calculated. The times are calculated starting from the beginning of the test, i.e. from the introduction of the samples in the oven.

The so obtained data are then integrated by using an Excel® file, obtaining a measurement of the total smoke emitted by the sample. The invention thermoprocessable perfluoropolymers give a value of the emitted smoke amount not higher than 150 units. According to the present invention values equal or lower than 150 are low smoke values. As internal standard, in this determination a commercial sample Hyflon® MFA 640 can be used. The smoke amount value of this polymer, measured by the present method, is about 500±100. Smoke values lower than 150 allow to pass the NFPA 255 rule.

The value of 150 has been found by correlating the smoke developed index values of Table 2 with the corresponding data of the smoke amount determined with the present method.

Determination of the Melt Flow Index (MFI)

The determination is carried out according to the ASTM D-1238 standard.

Determination of the Second Melting Temperature (T(II) Melt)

The second melting temperature is determined according to the ASTM D 4591 standard.

Determination of the Percentage by Weight of the Perfluoroalkylvinylether Monomers in the Polymer The determination of the perfluoroalkylvinylether monomers is carried out by FTIR analysis and expressed as percent by weight.

The PEVE content has been determined by FTIR spectroscopy according to the method described in U.S. Pat. No. 5,703,185, col. 4, lines 9-16, by using the multiplying coefficient 1.3 reported in the patent. In order to carry out the IR spectrum subtraction, a copolymer TFE/PMVE is used.

The PMVE content in the polymer has been determined under the following conditions: the band optical density (OD) at 889 $cm^{-1}$ is normalized with the band optical density (OD) at 2365 $cm^{-1}$ by means of the following formula:

% PMVE=(OD at 889 $cm^{-1}$)/(OD at 2365 $cm^{-1}$)×11.8

The PPVE content has been determined under the following conditions: the band optical density (OD) at 994 $cm^{-1}$ is normalized with the band optical density (OD) at 2365 $cm^{-1}$ by means of the following formula:

% PPVE=(OD at 994 $cm^{-1}$)/(OD at 2365 $cm^{-1}$)×0.99

Determination of the Tensile Properties

The determination is carried out at the temperature of 23° C. according to the type V ASTM D 638 standard.

Example 1a

Perfluoropolymer PMVE/PEVE/TFE 1.7/1/97.3 (Molar Ratio) (Primary Cable)

In an AISI 316 steel vertical 22 l autoclave, equipped with stirrer working at 400 rpm, after the vacuum has been made, were introduced in sequence:
  13.9 l of demineralized water;
  25 g of perfluoroethylvinylether PEVE;
  163 g of a microemulsion prepared according to U.S. Pat. No. 4,864,006.

The autoclave is then heated up to reaction temperature of 75° C., when this temperature is reached, 0.62 absolute bar (0.062 MPa) of ethane and 1.09 absolute bar (0.109 MPa) of PMVE are introduced.

By a compressor a gaseous mixture of TFE/PMVE/PEVE in nominal molar ratio of 97.6/1.4/1 is added until reaching a pressure of 21 absolute bar (2.1 MPa).

The composition of the gaseous mixture present at the autoclave head is analyzed by G.C. Before the reaction starts the gaseous phase results to be formed of the following compounds in the mentioned molar percentages: 88.3% TFE, 7.4% PMVE, 2.5% PEVE and about 1.8% ethane. Then, by a metering pump, 175 cc of a potassium persulphate (KPS) 0.0148 M solution are fed.

The polymerization pressure is maintained constant by feeding the above mentioned monomeric mixture; when 8,800 g of the mixture have been fed, the monomer feeding is interrupted. The reactor is cooled at room temperature, the latex is discharged and coagulated with $HNO_3$ (65% by weight) and the polymer is washed with $H_2O$ and dried at about 220° C.

Determination of the Obtained Polymer:
Composition (IR analysis):
  PMVE: 2.7% by weight, equal to 1.7% by moles;
  PEVE: 2.2% by weight, equal to 1.0% by moles.

MFI: 27 g/10'
Second melting temperature T(II) melting: 298° C.
Stress at break: 23 MPa
Smoke amount: 124
Dielectric constant: 2.1 (ASTM D150).

Example 1b

Perfluoropolymer PMVE/PEVE/TFE 1.5/1.1/97.4 (Molar Ratio) (Jacket)

The previous Example is repeated by introducing the following modifications:
  the fed ethane amount is 0.4 absolute bar (0.04 MPa);
  the KPS solution amount is 115 cc.

The composition of the gaseous mixture present at the autoclave head (G.C. analysis) is formed of the following compounds in the indicated molar percentages: 90.2% TFE, 6.3% PMVE, 2.5% PEVE and about 1.0% ethane.

Determinations on the Obtained Polymer:
Composition (IR analysis):
  PMVE: 2.5% by weight equal to 1.54% by moles;
  PEVE: 2.2% by weight, equal to 1.04% by moles.
MFI: 7 g/10'
Second melting temperature T(II) melting: 296° C.
Stress at break: 33.6 MPa
Smoke amount: 116
Dielectric constant: 2

Evaluation of the Processing Properties (Perfluoropolymer Extrusion Rate)

An extruder having a barrel with 38 mm diameter, a L/D ratio=30:1 and a screw compression ratio of 3:1 was used. The crosshead on the extruder is a B&H 75. The internal die diameter is 15 mm; the external tip diameter is 10 mm. Temperature profiles comprised between 250° C. and 400° C. and a screw angular rate of 53 rpm are used.

By using the perfluoropolymer to coat a copper cable, under the above mentioned extrusion conditions, line rates of 120 m/min have been obtained.

Example 1c

A cable was prepared wherein for the jacket the polymer of the Example 1b and for the primary cable the polymer of the Example 1a have been used, obtaining a cable construction 4 UTP.

The final cable is subjected to the determinations according to the NFPA 255 rule or NFPA 255 standard:
Smoke developed Index: 42.8;
Flame Spread Index: 1.33.

Example 2a Comparative

Perfluoropolymer PMVE/PPVE/TFE 4.6/0.4/95.0 (Ratio by Moles) (Primary Cable)

In the same autoclave described in the Example 1a, working at 400 rpm, after the vacuum has been made, there are introduced in sequence:
  13.9 l of demineralized water;
  80 g of perfluoropropylvinylether PPVE;
  130 g of the microemulsion of the Example 1a.

The autoclave is then heated up to the temperature of 75° C. When the autoclave reaches this temperature, 0.43 absolute bar (0.043 MPa) of ethane and 2.86 absolute bar (0.286 MPa) of PMVE are introduced.

By a compressor a gaseous mixture of TFE/PMVE in nominal molar ratio of 96.5/3.5 is added until reaching a pressure in the autoclave of 21 absolute bar (2.1 MPa). The composition of the gaseous mixture present at the autoclave head is analyzed by G.C. Before the reaction starts the gaseous phase results to be formed of the following compounds in the mentioned molar percentages: 79.5% TFE, 16% PMVE, 3.3% PPVE, 1.2% ethane. Then, by a metering pump, a KPS 0.0103 M solution with a flow rate of 170 cc/h is fed. The polymerization pressure is maintained constant by feeding the monomeric mixture. When 8,720 g of monomeric mixture have been fed, the monomer feeding is interrupted. The reactor is cooled at room temperature, the latex is discharged and coagulated with $HNO_3$ (65% by weight). The polymer is washed with $H_2O$ and dried at 220° C.
Determination of the Obtained Polymer:
Composition (IR analysis):
 PMVE: 7.3% by weight, equal to 4.6% by moles;
 PPVE: 1.0% by weight, equal to 0.4% by moles.
MFI: 21 g/10'
Second melting temperature T(II) melting: 286° C.
Stress at break: 25 MPa
Smoke amount: 500.

Example 2b Comparative

Perfluoropolymer PMVE/PPVE/TFE 4.6/0.4/95 (Ratio by Moles) (Jacket)

The previous Example is repeated but by feeding an ethane amount equal to 0.4 absolute bar (0.04 MPa).
Determinations on the Obtained Polymer:
Composition (IR analysis):
 PMVE: 7.3% by weight, equal to 4.6% by moles;
 PPVE: 1.0% by weight, equal to 0.4% by moles.
MFI: 12 g/10'
Second melting temperature T(II) melting: 286° C.
Stress at break: 28.6 MPa
Smoke amount: 500.

Example 2c Comparative

Perfluoropolymer PMVE/PPVE/TFE 4.6/0.4/95 (Ratio by Moles) (Jacket) with Low MFI One operates as described in the Example 2a but by feeding an ethane amount equal to 0.3 absolute bar (0.03 MPa).
Determinations on the Obtained Polymer:
Composition (IR analysis):
 PMVE: 6.0% by weight, equal to 3.7% by moles;
 PPVE: 1.0% by weight, equal to 0.4% by moles.
MFI: 3 g/10'
Second melting temperature T(II) melting: 283° C.
Stress at break: 38 MPa
Smoke amount: 400.

Example 2d Comparative

Cable Extrusion with Primary Cable Example 2a Comparative and Jacket Example 2b Comparative One proceeds as described in the Example 1c.
The final cable (primary+jacket) is subjected to the determinations according to the NFPA 255 standard:
Smoke developed Index: 161
Flame Spread Index: 1.3

Example 2e Comparative

Cable Extrusion with Primary Cable Example 2a Comparative and Jacket Example 2c Comparative One proceeds as described in the Example 1c.
The final cable (primary+jacket) is subjected to the determinations according to the NFPA 255 standard:
Smoke developed Index: 170
Flame Spread Index: 1.3

Example 3a Comparative

Perfluoropolymer PMVE/PEVE/TFE 2.2/1.1/96.7 (Ratio by Moles) (Primary Cable)

The Example 1a is repeated by introducing the following modifications:
 the amount of PEVE initially introduced is 26 g;
 the ethane amount is 0.52 absolute bar (0.052 MPa);
 the PMVE amount is 1.28 absolute bar (0.128 MPa);
 the initially introduced KPS solution amount having a concentration of 0.0103 M is 250 ml.
Furthermore the fed gaseous mixture is formed of TFE/PMVE/PEVE in the nominal molar ratios 97.3/1.7/1. The initial gas phase before the reaction starts has the following molar composition: 7.7% PMVE, 2.3% PEVE, 1.3 ethane, 88.7% TFE.
During the whole reaction a KPS 0.0103 M solution at a flow-rate of 170 cc/h is fed.
Determinations on the Obtained Polymer:
Composition (IR analysis):
 PMVE: 3.6% by weight, equal to 2.2% by moles;
 PEVE: 2.2% by weight, equal to 1.1% by moles.
MFI: 26 g/10'
Second melting temperature T(II) melting: 294.5° C.
Stress at break: 23.5 MPa
Smoke amount: 200.

Example 3b

Perfluoropolymer PMVE/PEVE/TFE 1.0/0.75/98.25 (Ratio by Moles) (Primary Cable)

The Example 1a is repeated by introducing the following modifications:
 the amount of PEVE initially introduced is 22 g;
 the ethane amount is 0.64 absolute bar (0.064 MPa);
 the PMVE amount is 0.79 absolute bar (0.079 MPa);
Furthermore the fed gaseous mixture is formed of TFE/PMVE/PEVE in the nominal molar ratios 98.7/0.8/0.5. The initial gas phase before the reaction starts has the following molar composition: 4.6% PMVE, 2.1% PEVE, 2% ethane, 91.4% TFE.
The polymer composition determined by IR analysis is the following:
 PMVE: 1.7% by weight, equal to 1.0% by moles;
 PEVE: 1.6% by weight, equal to 0.75% by moles.
MFI: 26 g/10'
Second melting temperature T(II) melting: 304° C.
Stress at break: 17 MPa
Smoke amount: 53.

Example 4

TFE/PEVE Copolymer (Jacket)

In an AISI 316 steel 5 l autoclave, equipped with stirrer working at 650 rpm, after the vacuum has been made, were introduced in sequence:

3.0 l of demineralized water;
14 g of perfluoroethylvinylether PEVE;
34 g of a microemulsion prepared according to U.S. Pat. No. 4,864,006.

The autoclave is then heated up to a reaction temperature of 60° C., when this temperature is reached, 0.63 absolute bar (0.063 MPa) of ethane are introduced.

By a compressor a gaseous mixture of TFE/PEVE in nominal molar ratio respectively of 98/2 corresponding as % by weight to 95.8/4.2 is added until reaching a pressure of 21 absolute bar (2.1 MPa).

The composition of the gaseous mixture present at the autoclave head is analyzed by G.C. Before the reaction starts the gaseous phase results to be formed of the following compounds in the indicated molar percentages: 96.0% TFE, 2.7% PEVE and about 1.2% ethane. Then, by a metering pump, 60 cc of a potassium persulphate (KPS) 0.0268 M solution are fed.

The polymerization pressure is maintained constant by feeding the above mentioned monomeric mixture; when 1,560 g of the mixture have been fed, the monomer feeding is interrupted. The reactor is cooled at room temperature, the latex is discharged and coagulated with $HNO_3$ (65% by weight) and the polymer is washed with $H_2O$ and dried at about 220° C.

Determinations of the Obtained Polymer:
Composition (IR analysis):
  PEVE: 4.3% by weight.
MFI: 9 g/10'
Second melting temperature T(II) melting: 302.6° C.
Stress at break: 32 MPa
Smoke amount: 148.

Example 5 Comparative

TFE/PEVE Copolymer (Jacket)

In an AISI 316 steel 5 l autoclave, equipped with stirrer working at 650 rpm, after the vacuum has been made, were introduced in sequence:
3.0 l of demineralized water;
14 g of perfluoroethylvinylether PEVE;
34 g of a microemulsion prepared according to U.S. Pat. No. 4,864,006.

The autoclave is then heated up to a reaction temperature of 60° C., when this temperature is reached, 0.63 absolute bar (0.063 MPa) of ethane are introduced.

By a compressor a gaseous mixture of TFE/PEVE in molar ratio respectively of 98/2 is added until reaching a pressure of 21 absolute bar (2.1 MPa).

The composition of the gaseous mixture present at the autoclave head is analyzed by G.C. Before the reaction starts the gaseous phase results to be formed of the following compounds in the indicated molar percentages: 96.0% TFE, 2.7% PEVE and about 1.2% ethane. Then, by a metering pump, 60 cc of a potassium persulphate (KPS) 0.0268 M solution are fed.

The polymerization pressure is maintained constant by feeding the above mentioned monomeric mixture; when 1,560 g of the mixture have been fed, the monomer feeding is interrupted. The reactor is cooled at room temperature, the latex is discharged and coagulated with $HNO_3$ (65% by weight) and the polymer is washed with $H_2O$ and dried at about 220° C.

Determinations of the Obtained Polymer:
Composition (IR analysis):
  PEVE: 7.0% by weight.
MFI: 12 g/10'
Second melting temperature T(II) melting: 285° C.
Stress at break: 31 MPa
Smoke amount: 265.

Example 6

PMVE/PPVE/TFE 0.93/1.27/97.8 (Ratio by Moles) Terpolymer (Primary Cable)

Example 1a is repeated by introducing the following modifications the amount of PPVE initially introduced is 50 g;
the ethane amount is 0.50 absolute bar (0.05 MPa);
the PMVE amount is 0.64 absolute bar (0.064 MPa).

Furthermore the fed gaseous mixture is formed of TFE/PMVE/PPVE in the nominal molar ratios 97.9/0.8/1.3. By a metering pump 90 cc of a KPS solution 0.0296 M are fed. The initial gas phase before the reaction starts has the following molar composition: 3.8% PMVE, 3.0% PPVE, 1.5% ethane, 91.7% TFE.

The polymerization pressure is maintained constant by feeding the gaseous mixture formed of TFE/PMVE/PPVE having the above reported composition. When 8,800 g of said mixture have been fed, monomer feeding is interrupted and the pressure (21 absolute bar) is let fall to 10 absolute bar.

The polymer composition determined by IR analysis is the following:
  PMVE: 1.5% by weight, equal to 0.93% by moles;
  PPVE: 3.3% by weight, equal to 1.27% by moles.
MFI: 30 g/10'
Second melting temperature T(II) melting: 301° C.
Stress at break: 26.7 MPa
Smoke amount: 90.

Example 7

PPVE/TFE Copolymer (Primary Cable)

Example 1a is repeated by introducing the following modifications
the amount of PPVE initially introduced is 70 g;
the ethane amount is 0.60 absolute bar (0.06 MPa);
the temperature of polymerization is 65° C.;
the amount of KPS solution 0.0296 M initially introduced is of 250 ml.

Furthermore the fed gaseous mixture is formed of TFE/PPVE in the nominal molar ratios 98.2/1.8. The initial gas phase before the reaction starts has the following molar composition: 4.1% PPVE, 1.6% ethane, 94.3% TFE.

The polymerization pressure is maintained constant by feeding the gaseous mixture formed of TFE/PPVE having the above reported composition. When 6,600 g of said mixture have been fed, monomer feeding is interrupted and the pressure (21 absolute bar) is let fall to 10 absolute bar.

The PPVE content of the polymer determined by IR analysis is the following:
  PPVE: 4.5% by weight, equal to 1.74% by moles.
MFI: 26 g/10'
Second melting temperature T(II) melting: 305° C.
Stress at break: 30.8 MPa
Smoke amount: 80.

The data reported in the Examples are summarized in the following Tables 1, 1A and 2 which report the results of the Smoke Developed Index and Flame Spread Index values of the extruded cables in category 5e constructions determined according to NFPA 255 standard.

TABLE 1

| Ex. | Cable type | MFI g/10' | PMVE % wt. | PEVE % wt. | PPVE % wt. | Tm °C. | PAVE % wt. | stress at break MPa | smoke |
|---|---|---|---|---|---|---|---|---|---|
| 1a | primary | 27 | 2.7 | 2.2 | — | 298 | 4.9 | 23 | 124 |
| 1b | jacket | 7 | 2.5 | 2.5 | — | 296 | 5.0 | 33.6 | 116 |
| 2a comp | primary | 21 | 7.3 | — | 1.1 | 286 | 8.4 | 25 | 500 |
| 2b comp | jacket | 12 | 7.3 | — | 1.1 | 286 | 8.4 | 28.6 | 500 |
| 2c comp | jacket | 3 | 6 | — | 1 | 283 | 7 | 38 | 400 |
| 3a comp | primary | 26 | 3.6 | 2.2 | — | 294.5 | 5.8 | 23.5 | 200 |
| 3b | primary | 26 | 1.7 | 1.6 | — | 304 | 3.3 | 17 | 53 |

TABLE 1A

| Ex. | Cable type | MFI g/10' | PMVE % wt. | PEVE % wt. | PPVE % wt. | Tm | PAVE % wt. | Stress at break MPa | smoke |
|---|---|---|---|---|---|---|---|---|---|
| 4 | jacket | 9 | — | 4.3 | — | 302.6 | 4.3 | 32 | 148 |
| 5 comp | jacket | 12 | — | 7 | — | 285 | 7 | 31 | 265 |
| 6 | primary | 30 | 1.5 | — | 3.3 | 301 | 4.8 | 26.7 | 90 |
| 7 | primary | 26 | — | — | 4.5 | 305 | 4.5 | 30.8 | 80 |

TABLE 2

| | Primary cable | | Jacket | | NFPA 255 Standard | | Category 5e |
|---|---|---|---|---|---|---|---|
| Ex. | Ex. | MFI g/10' | Ex. | MFI g/10' | Smoke Developed Index | Flame Spread Index | cable construction |
| 1c | 1a | 27 | 1b | 7 | 42.8 | 1.33 | 4 UTP |
| 2d comp | 2a comp | 21 | 2b comp | 12 | 161 | 1.3 | 4 UTP |
| 2e comp | 2a comp | 21 | 2c comp | 3 | 170 | 1.3 | 4 UTP |

Example 8

Perfluoropolymer PMVE/PEVE/HFP/TFE 0.5/1.2/0.6/97.7 (Molar Ratio) (Primary Cable)

In an AISI 316 steel vertical 22 l autoclave, equipped with stirrer working at 400 rpm, after the vacuum has been made, were introduced in sequence:
    13.9 l of demineralized water;
    33 g of PEVE;
    163 g of a microemulsion prepared according to U.S. Pat. No. 4,864,006.
The autoclave is then heated up to reaction temperature of 75° C., when this temperature is reached, 4.4 absolute bar (0.044 MPa) of HFP, 0.55 absolute bar (0.055 MPa) of ethane and 0.4 absolute bar (0.04 MPa) of PMVE are introduced.

A gaseous mixture formed of TFE/PMVE/PEVE in nominal molar ratio of 98.3/0.5/1.2 is added by a compressor until reaching a pressure of 21 absolute bar.

The composition of the gaseous mixture present at the autoclave head is analyzed by G.C. Before the reaction starts the gaseous phase results to be formed of the following compounds in the mentioned molar percentages: 72.7% TFE, 2.3% PMVE, 2.7% PEVE, HFP 21% and about 1.3% ethane. Then, by a metering pump, 175 cc of a KPS 0.0148 M solution are fed.

The polymerization pressure is maintained constant by feeding the above mentioned monomeric mixture; when 8,671 g of the mixture have been fed, the monomer feeding is interrupted. The reactor is cooled at room temperature, the latex is discharged and coagulated with $HNO_3$ (65% by weight) and the polymer is washed with $H_2O$ and dried at about 220° C.

Determinations of the Obtained Polymer:
Composition (IR analysis):
    PMVE: 0.8% by weight, equal to 0.5% by moles;
    PEVE: 2.6% by weight, equal to 1.2% by moles;
    HFP: 0.9% by weight, equal to 0.6% by moles.
MFI: 24.5 g/10'
Second melting temperature T(II) melting: 297.4° C.
Stress at break: 25 MPa
Smoke amount: 65
Dielectric constant: 2.1 (ASTM D150).

Example 9

Perfluoropolymer PMVE/PPVE/HFP/TFE 0.6/1.2/1.6/96.6 (Ratio by Moles) (Primary Cable)

The Example 8 is repeated but the HFP amount initially introduced is 8.8 absolute bar (0.88 MPa) and the ethane amount is 0.45 absolute bar.

The composition of the gaseous mixture at the autoclave head, analyzed by G.C., results to be formed of the following compounds in the mentioned molar percentages: 47.9% TFE, 2.6% PMVE, 3.0% PEVE, HFP 45.5% and about 1.0% ethane.

When 8,592 g of the mixture have been fed, the monomer feeding is interrupted.

Determinations on the Obtained Polymer:
Composition (IR analysis):
　　PMVE: 0.9% by weight, equal to 0.6% by moles;
　　PEVE: 2.6% by weight, equal to 1.2% by moles;
　　HFP: 2.4% by weight, equal to 1.6% by moles.
MFI: 28 g/10'
Second melting temperature T(II) melting: 289° C.
Stress at break: 27.6 MPa
Smoke amount: 60
Dielectric constant: 2.

Example 10 Comparative

Perfluoropolymer TFE/HFP/PEVE (Primary) with PEVE Amount of 6% by Weight

In an AISI 316 steel vertical 5l autoclave, equipped with stirrer working at 650 rpm, after the vacuum has been made, were introduced in sequence:
　　3 l of demineralized water;
　　31 g of microemulsion prepared according to U.S. Pat. No. 4,864,006;
　　28 g of PEVE.
When the reaction temperature of 75° C. has been reached, are introduced:
　　0.1 absolute bar (0.01 MPa) of ethane;
　　8.8 absolute bar (0.88 MPa) of HFP.
A gaseous mixture formed of TFE/PEVE/HFP in nominal molar ratio of 93.2/2.5/4.3 is added by a compressor until reaching a pressure of 21 (2.1 MPa) absolute bar. The composition of the gaseous mixture present at the autoclave head is analyzed by G.C. By a metering pump, 20 ml of a KPS solution having 0.0907 M concentration are fed, and then, every 60 minutes 10 ml of the same solution are fed into the autoclave. The polymerization pressure is maintained constant by feeding the above mentioned gaseous monomeric mixture for the whole duration of the reaction. The monomer feeding is interrupted when 1,560 g of the above mentioned gaseous monomeric mixture have been fed.
Determinations of the Obtained Polymer:
Composition (IR analysis):
　　PEVE: 6.0% by weight, equal to 2.9% by moles;
　　HFP: 5.4% by weight, equal to 3.8% by moles.
MFI: 30 g/10'
Second melting temperature T(II) melting: 260° C.
Stress at break: 34.6 MPa
Smoke amount: 450
Dielectric constant: 2.

Example 11

Perfluoropolymer PMVE/PEVE/TFE/HFP 0.49/1.08/97.82/0.61 (Ratio by Moles) (Jacket)

In an AISI 316 steel vertical 22 l autoclave, equipped with stirrer working at 400 rpm, after the vacuum has been made, were introduced in sequence:
　　13.9 l of demineralized water;
　　35 g of PEVE;
　　163 g of a microemulsion prepared according to U.S. Pat. No. 4,864,006.
The autoclave is successively heated up to 75° C. At this temperature, 0.35 absolute bar (0.0035 MPa) of ethane, 0.4 absolute bar (0.004 MPa) of PMVE and 4.4 absolute bar (0.044 MPa) of HFP are introduced.

A gaseous mixture formed of TFE/PMVE/PEVE in nominal molar ratio 98.3/0.5/1.2 is added by a compressor until reaching a pressure of 21 absolute bar (0.21 MPa).
The composition of the gaseous mixture present at the autoclave head is analyzed by G.C. Before the reaction starts, the gaseous phase results to be formed of the following compounds in the indicated molar percentages: 71.9% TFE, 2.2% PMVE, 4.0% PEVE, 21% HFP and 0.9% ethane. Then, by a metering pump 180 cc of a KPS 0.0148 M solution are fed.
The polymerization pressure is maintained constant by feeding the above monomeric mixture; when 8,671 g of mixture have been fed, the monomer feeding is interrupted and the pressure inside the reactor is let fall from 21 absolute bar to 10 absolute bar (0.1 MPa) maintaining the temperature at 75° C. The reactor is cooled at room temperature, the latex is discharged and coagulated with $HNO_3$ (65% by weight) and the polymer is washed with $H_2O$ and dried at about 220° C.
Determinations on the Obtained Polymer:
Composition (IR analysis):
　　PMVE: 0.8% by weight, equal to 0.49% by moles;
　　PEVE: 2.3% by weight, equal to 1.08% by moles;
　　HFP: 0.9% by weight, equal to 0.61% by moles;
MFI: 6.5 g/10'
Second melting temperature T(II) melting: 298.9° C.
Stress at break: 32.7 MPa
Smoke amount: 70
Dielectric constant: 2.1 (ASTM D150).
Evaluation of the Processing Properties (Extrusion Rate of the Perfluoropolymer An extruder having a barrel with 38 mm diameter, L/D ratio=30:1 and a screw compression ratio of 3:1 was used.
The crosshead on the extruder is a B&H 75. The die internal diameter is 15 mm; the tip external diameter is 10 mm. Temperature profiles comprised between 250° C. and 400° C. and a screw angular rate of 70 rpm are used.
By using the perfluoropolymer to coat a copper cable, under the above mentioned extrusion conditions, line rates of 160 m/min were obtained.

Example 12

Perfluoropolymer PMVE/PEVE/TFE/HFP 1.05/1.23/94.6/0.61 (Ratio by Moles) (Primary)

One operates as in the Example 11 except for the conditions indicated below:
　　the PEVE amount introduced at the beginning of the reaction is 40 g;
　　the reaction temperature is 70° C.;
　　when the reaction temperature has been reached, 0.72 absolute bar (0.0072 MPa) of PMVE, 4.4 absolute bar (0.044 MPa) of HFP, 0.53 absolute bar (0.0052 MPa) of ethane are introduced;
　　the gaseous mixture fed into the autoclave is formed of the following compounds, in the indicated nominal molar ratios: 97.7 TFE, 0.9 PMVE, 1.4 PEVE; the mixture is added by a compressor until having 21 absolute bar in the reactor;
　　by a metering pump 180 cc of a KPS 0.00296 M solution are fed;
　　the polymerization pressure is maintained constant by feeding the monomeric mixture TFE/PMVE/PEVE; when 8,671 g of this mixture have been fed, the monomer feeding is interrupted and the pressure is let fall as described in the Example 11.

Determinations on the Obtained Polymer:
Composition (IR analysis):
    PMVE: 1.7% by weight, equal to 1.05% by moles;
    PEVE: 2.8% by weight, equal to 1.23% by moles;
    HFP: 0.9% by weight, equal to 0.61% by moles;
MFI: 22.2 g/10'
Second melting temperature T(II) melting: 293.8° C.
Stress at break: 27.3 MPa
Smoke amount: 95
Dielectric constant: 2.1 (ASTM D150).

Example 13

Perfluoropolymer PMVE/PEVE/TFE/HFP
0.8/1.8/96.78/0.62 (Ratio by Moles) (Primary)

One operates as in the Example 11 except for the conditions indicated below:
    the PEVE amount introduced at the beginning of the reaction is 41 g;
    the reaction temperature is 70° C.;
    when the reaction temperature has been reached, 0.56 absolute bar (0.0056 MPa) of PMVE, 4.4 absolute bar (0.044 MPa) of HFP, 0.51 absolute bar (0.0051 MPa) of ethane are introduced;
    the gaseous mixture fed into the autoclave is formed of the following compounds, in the indicated nominal molar ratios: 97.5 TFE, 0.8 PMVE, 1.7 PEVE; the mixture is added by a compressor until having 21 absolute bar in the reactor;
    by a metering pump 175 cc of a KPS 0.00148 M solution are fed;
    the polymerization pressure is maintained constant by feeding the gaseous mixture TFE/PMVE/PEVE; when 8,671 g of this mixture have been fed, the monomer feeding is interrupted and the pressure is let fall up to 9 absolute bar (0.09 MPa) as described in the Example 11.
Determinations on the Obtained Polymer:
Composition (IR analysis):
    PMVE: 1.3% by weight, equal to 0.8% by moles;
    PEVE: 3.7% by weight, equal to 1.8% by moles;
    HFP: 0.9% by weight, equal to 0.62% by moles;
MFI: 29.0 g/10'
Second melting temperature T(II) melting: 290.8° C.
Stress at break: 29.9 MPa
Smoke amount: 115
Dielectric constant: 2.1 (ASTM D150).

Example 14

Perfluoropolymer PMVE/PEVE/TFE/HFP
0.74/1.37/97.28/0.61 (Ratio by Moles) (Jacket)

One operates as in the Example 11 except for the conditions indicated below:
    the PEVE amount introduced at the beginning of the reaction is 41 g;
    when the reaction temperature has been reached, 0.56 absolute bar (0.0056 MPa) of PMVE, 4.4 absolute bar (0.044 MPa) of HFP, 0.49 absolute bar (0.0049 MPa) of ethane are introduced;
    the gaseous mixture fed into the autoclave is formed of the following compounds, in the indicated nominal molar ratios: 97.8 TFE, 0.7 PMVE, 1.5 PEVE; the mixture is added by a compressor until reaching 21 absolute bar in the reactor;
    by a metering pump 90 cc of a KPS 0.00296 M solution are fed;
    the polymerization pressure is maintained constant by feeding the gaseous mixture TFE/PMVE/PPVE; when 8,670 g of this mixture have been fed, the monomer feeding is interrupted and the pressure is let fall as described in the Example 11.
Determinations on the Obtained Polymer:
Composition (IR analysis):
    PMVE: 1.2% by weight, equal to 0.74% by moles;
    PEVE: 2.9% by weight, equal to 1.37% by moles;
    HFP: 0.9% by weight, equal to 0.61% by moles.
MFI: 10.5 g/10'
Second melting temperature T(II) melting: 294.5° C.
Stress at break: 35 MPa
Smoke amount: 85
Dielectric constant: 2.1 (ASTM D150).

Example 15

Perfluoropolymer PMVE/PPVE/TFE/HFP
2.4/0.31/96.68/0.61 (Ratio by Moles) (Primary)

One operates as in the Example 11 except for the conditions indicated below:
    the PPVE amount introduced at the beginning of the reaction is 12 g;
    when the reaction temperature has been reached, 1.5 absolute bar (0.015 MPa) of PMVE, 4.4 absolute bar (0.044 MPa) of HFP, 0.47 absolute bar (0.0047 MPa) of ethane are introduced;
    the gaseous mixture fed into the autoclave is formed of the following compounds, in the indicated nominal molar ratios: 97.7 TFE, 2.0 PMVE, 0.3 PPVE; the mixture is added by a compressor until reaching 21 absolute bar in the reactor;
    by a metering pump 90 cc of a KPS 0.00296 M solution are fed;
    the polymerization pressure is maintained constant by feeding the gaseous mixture TFE/PMVE/PEVE; when 8,671 g of this mixture have been fed, the monomer feeding is interrupted and the pressure is let fall to 10 absolute bar (0.1 MPa) maintaining the temperature at 75° C.
The polymer is then recovered as reported in example 1.
Determinations on the Obtained Polymer:
Composition (IR analysis):
    PMVE: 3.9% by weight, equal to 2.4% by moles;
    PPVE: 0.8% by weight, equal to 0.31% by moles;
    HFP: 0.9% by weight, equal to 0.61% by moles.
MFI: 30 g/10'
Second melting temperature T(II) melting: 295° C.
Stress at break: 20 MPa
Smoke amount: 85
Dielectric constant: 2.1 (ASTM D150).

The data reported in the Examples from 8 to 16 are summarized in the following Table 3 wherein under the column "cable", prim means primary cable and jack means jacket.

A comparison of Table 3 with Table 1 shows that at the same or similar melt flow index and melting point, the perfluoropolymers containing HFP show a lower smoke value according to the internal test. See Example 1a (Table 1) compared with Example 8 (Table 3) and Example 1b (Table 1) with Example 14 (Table 3).

TABLE 3

| Ex. | Cable | MR g/10 | PMVE % wt. | PEVE % wt. | PPVE % wt. | HFP | Tm °C. | PAVE % wt. | Stress at break MPa | Smoke |
|---|---|---|---|---|---|---|---|---|---|---|
| 8 | prim | 24.5 | 0.8 | 2.6 | — | 0.9 | 297.4 | 3.4 | 25 | 65 |
| 9 | prim | 28 | 0.9 | 2.6 | — | 2.4 | 289 | 3.5 | 27.6 | 60 |
| 10 comp | prim | 30 | — | 6.0 | — | 5.4 | 260 | 6.0 | 34.6 | 450 |
| 11 | jack | 6.5 | 0.8 | 2.3 | — | 0.9 | 289.9 | 3.1 | 32.7 | 70 |
| 12 | prim | 22.5 | 1.7 | 2.8 | — | 0.9 | 293.8 | 4.5 | 27.3 | 95 |
| 13 | prim | 29 | 1.3 | 3.7 | — | 0.9 | 290.8 | 5.0 | 29.9 | 115 |
| 14 | jack | 10.5 | 1.2 | 2.9 | — | 0.9 | 294.5 | 4.1 | 35 | 85 |
| 15 | prim | 30 | 3.9 | — | 0.8 | 1.1 | 295 | 4.7 | 20 | 85 |

The invention claimed is:

1. A coating for a primary cable and for an external jacket, comprising tetrafluoroethylene (TFE) thermoprocessable perfluoropolymers, wherein the TFE thermoprocessable perfluoropolymers have a stress at break of at least 17 MPa, as measured according to ASTM D 638, type V, at 23° C., the TFE thermoprocessable perfluoropolymers comprising perfluoroalkylvinylethers in the following amounts, expressed as percent by weight of the total monomers:
   a) 0.8-2.7% of perfluoromethylvinylether (PMVE);
   b) 1.6-3.7% of perfluoroethylvinylether (PEVE);
   wherein the total amount of perfluoroalkylvinylethers a)+b) ranges from greater than 4.0% to 5.0% by weight of total monomers;
   c) from 0.5 to 6% of hexafluoropropene (HFP);
   the TFE amount being the complement to 100% by weight.

2. The coating according to claim 1, wherein the thermoprocessable perfluoropolymers contain 0.7-4.0% of HFP.

3. The coating according to claim 1, wherein the perfluoropolymers are in admixture with inorganic fillers.

4. The coating according to claim 1, wherein the TFE thermoprocessable perfluoropolymers have a Melt Flow Index (MFI) between 1 and 60 g/10 min, as measured according to ASTM D-1238.

5. A primary cable coated with the coating according to claim 4, wherein the TFE thermoprocessable perfluoropolymers have a MFI between 20 and 40 g/10 min.

6. A jacket comprising the coating according to claim 4, wherein the TFE thermoprocessable perfluoropolymers have a MFI between 2 to 10 g/10 min.

7. A tetrafluoroethylene (TFE) thermoprocessable perfluoropolymer having stress at break of at least 17 MPa as measured according to ASTM D 638, type V, at 23° C., the TFE thermoprocessable perfluoropolymer comprising perfluoroalkylvinylethers in the following amounts, expressed as percent by weight of the total monomers:
   a) 0.8-2.7% of perfluoromethylvinylether (PMVE);
   b) 1.6-3.7% of perfluoroethylvinylether (PEVE);
   c) from 0.5 to 6% of hexafluoropropene (HFP);
   wherein the total amount of perfluoroalkylvinylethers a)+b) ranges from greater than 4.0% to 5.0% by weight of the total monomers;
   the TFE amount being the complement to 100% by weight.

8. The TFE thermoprocessable perfluoropolymer according to claim 7, comprising 0.7-4.0% of HFP.

9. A cable wherein the coating of the primary cable and/or jacket is formed of the perfluoropolymers according to claim 7.

10. A coating for a primary cable and for an external jacket, comprising tetrafluoroethylene (TFE) thermoprocessable perfluoropolymers, wherein the TFE thermoprocessable perfluoropolymers have a Melt Flow Index (MFI) between 1 and 60 g/10 min, as measured according to ASTM D-1238, the thermoprocessable perfluoropolymers comprising perfluoroalkylvinylethers in the following amounts, expressed as percent by weight of the total monomers:
   a) 0.8-2.7% of perfluoromethylvinylether (PMVE);
   b) 1.6-3.7% of perfluoroethylvinylether (PEVE);
   wherein the total amount of perfluoroalkylvinylethers a)+b) ranges from greater than 4.0% to 5.0% by weight of the total monomers;
   c) 0.7-4.0% of hexafluoropropene (HFP);
   the TFE amount being the complement to 100% by weight.

11. The coating according to claim 10, wherein the TFE thermoprocessable perfluoropolymers have a MFI between 20 and 40 g/10 min.

12. The coating according to claim 10, wherein the TFE thermoprocessable perfluoropolymers have a MFI between 2 and 10 g/10 min.

13. A tetrafluoroethylene (TFE) thermoprocessable perfluoropolymer having a Melt Flow Index (MFI) between 1 and 60 g/10 min, as measured according to ASTM D-1238, said perfluoropolymer comprising perfluoroalkylvinylethers in the following amounts, expressed as percent by weight of the total monomers:
   a) 0.8-2.7% of perfluoromethylvinylether (PMVE);
   b) 1.6-3.7% of perfluoroethylvinylether (PEVE);
   wherein the total amount of perfluoroalkylvinylethers a)+b) ranges from greater than 4.0% to 5.0% by weight of the total monomers;
   c) 0.7-4.0% of hexafluoropropene (HFP);
   the TFE amount being the complement to 100% by weight.

* * * * *